July 31, 1923.
L. G. COPEMAN
REFRIGERATING APPARATUS
Filed July 8, 1922
1,463,419
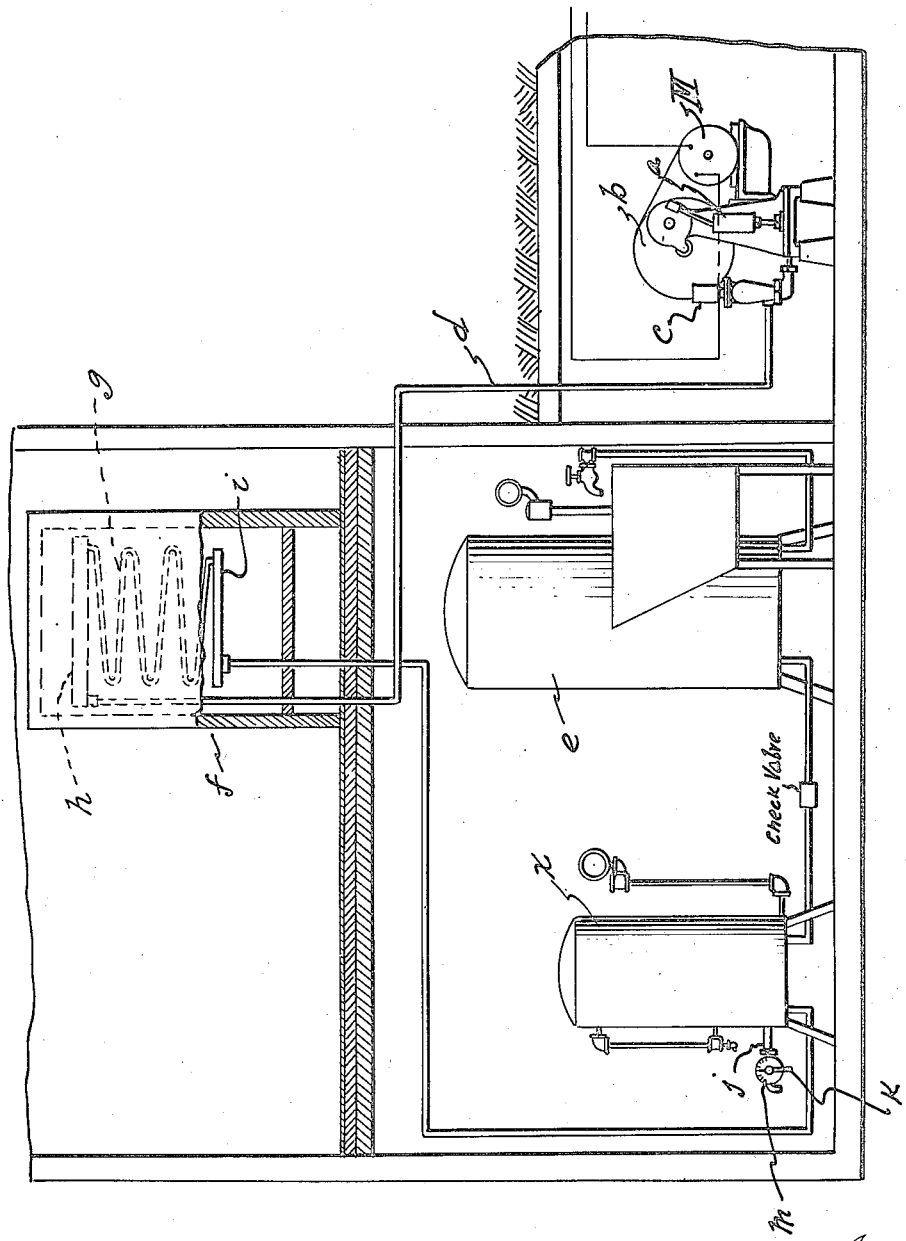
Inventor
LLOYD G. COPEMAN
By Stuart C. Barnes
Attorney Patented July 31, 1923.

1,463,419

UNITED STATES PATENT OFFICE.

LLOYD G. COPEMAN, OF FLINT, MICHIGAN, ASSIGNOR TO EDWIN W. ATWOOD, OF FLINT, MICHIGAN.

REFRIGERATING APPARATUS.

Application filed July 8, 1922. Serial No. 573,601.

*To all whom it may concern:*

Be it known that I, LLOYD G. COPEMAN, a citizen of the United States, residing at Flint, in the county of Genesee and State of Michigan, have invented certain new and useful Improvements in Refrigerating Apparatus, of which the following is a specification.

This invention relates to refrigeration and has for its object refrigerating apparatus arranged to maintain a substantially uniform temperature and which eliminates the necessity of a thermostat and a motor for operating the valve that controls the flow of cold water through the box.

In a number of my prior applications and patents, notably in Patent No. 1,409,283 issued on the 4th day of March, 1922, I have described and claimed a system of refrigeration using a pressure controlled pump which is connected with a refrigerating apparatus, provided with a thermostat that opens and closes a valve in the water line by the use of an electric motor. This construction is very satisfactory in practice, but obviously the thermostat and motor are relatively expensive elements in the apparatus.

It is the object of the present invention to get substantially similar results by eliminating the thermostat and substitute in place therefor a bleeder pipe connected with the water storage tank.

The figure is an elevation of the apparatus, somewhat diagrammatically shown.

A pump $a$ is operated by electric motor M which drives the fly wheel $b$. This motor has a pressure-regulated switch $c$ in the electric circuit which furnishes current to the armature and the field. The operation of a pressure controlled switch of this kind is well understood as it is described in detail and shown in detail in my prior Patent No. 1,409,283. Suffice it to say here that when the pressure in the water line $d$ falls below a given point, this closes the circuit, excites the motor and the pump continues to pump until enough water has been introduced into the storage tank $e$ to compress the air head and raise the pressure to a given point, say 70 pounds. A water pumping system of this kind is quite a common thing now in rural communities. The water is usually taken from a deep well where the water is cold the year around, so it can be advantageously applied for extracting heat from a refrigerating box $f$. To this end, the water line main $d$ supplies water to this box $f$ and the coils $g$, the water being distributed through the upper header $h$ to the lower header $i$.

It will be unnecessary for me to describe in detail the specific pipe construction. Arrangements for the distribution of the water through the walls of the box such as this has been amply described in a number of my prior applications and Patent No. 1,409,283. The specific arrangement is no part of the present invention.

In all my prior structures, it has been customary to employ a waste pipe leading from the lower header and a thermostatically controlled motor and valve serve to open a way through this pipe to discharge what I have preferably called "waste water". This discharge is effected when the temperature in the food chamber rises above a given point. It is the purpose of the present invention to do away with the necessity of the thermostat except where extremely accurate and uniform temperatures are desired in the box.

I effect this object by placing a bleeder pipe $j$ in the storage tank $x$ and provide a valve $k$ therein in connection with graduations $m$ to indicate the amount of opening. By bleeding this tank with a very small stream of water, this will insure the pressure in the tank being periodically reduced to a point which will draw a new supply of cold water into the refrigerating coils at stated times. The requirements of certain temperatures will be readily learned by the operator of the apparatus or they may be stated in an instruction pamphlet, so that the operator will know that in weather of an average, say of 60 degrees of temperature that the tank should be bled at a certain rate to achieve certain desired results in the box. By this bleeding operation it is possible to get a large quantity of fresh, cold water at a stated period, provided the bleeding operation takes place at a point of the line where the pressure in the line is reduced.

In the figure shown I have shown an extra tank $x$ connected with the large storage tank $e$ by a pipe having a check valve. Where the storage tank found in the water system is not larger than, say forty gallons, this will be suitable for bleeding to make my system work satisfactorily. Where the storage tank has a relatively large capacity an economical bleeding operation would reduce the pressure so slowly that it would require long periods of time before the pump would operate and the refrigeration would not be satisfactory. I, therefore, provide an additional tank for bleeding where the tank is relatively large. This I close off from the large storage tank by means of a check valve. Consequently by using this auxiliary storage tank x the pump can be caused to operate at comparatively frequent intervals without an unduly wasteful rate of bleeding.

What I claim is:

1. In refrigerating apparatus, the combination of a chamber to be cooled, a water line passing in heat-exchanging adjacency to said chamber, a pressure-controlled pump for supplying water to the water line, a storage tank, supplied with water from that portion of the water line that passes in such adjacency to the chamber to be cooled, and means for bleeding water to relieve the pressure in the storage tank at stated periods to cause the pump to supply a new charge of cold water to the portion of the water line in such adjacency with the cooling chamber.

2. In a refrigerating apparatus, the combination of a chamber to be cooled, a water line provided with coils in heat exchanging relation with said chamber, a storage tank supplied with water by said water line after the water has passed through the said coil, a pressure-regulated pump for supplying water to the water line, and a bleeding pipe regulated by a valve for bleeding water to lower the pressure in the water tank so that at stated periods the pump will be caused to supply a new charge of cold water to the said coils.

3. In a refrigerating apparatus, the combination of a chamber to be cooled, a water line having a portion in heat exchanging relation with said chamber to absorb heat therefrom, a pressure regulated pump for supplying water to said water line, and means for bleeding water to bring the pressure down to a point to operate the pump at stated periods to supply a new charge of cold water to the water line adjacent to the cooling chamber.

4. In a refrigerating apparatus, the combination of a chamber to be cooled, a water line passing in heat exchanging relation with said chamber to absorb heat therefrom, a pressure regulated pump for supplying cold water to said line, and a controlled bleeding pipe for letting out a variant flow of water in a continuous stream to reduce the pressure and periodically cause the pump to supply a new charge to that portion of the line adjacent to the food chamber.

5. In a refrigerating apparatus, the combination of a chamber to be cooled, a water line passing in heat exchanging relation with said chamber, a pressure-controlled pump for supplying cold water to said line, a storage tank supplied with water from that portion of the water line that passes in adjacency with the chamber to be cooled, an auxiliary storage tank connected with the water line between the said storage tank and that portion of the water line that passes in adjacency with the chamber to be cooled, means for preventing the first mentioned storage tank supplying the auxiliary tank with water, and means for bleeding water to relieve the pressure in the auxiliary storage tank at stated periods and thereby causing the pump to supply new charges of cold water to that portion of the water line in adjacency with the chamber to be cooled.

6. In a refrigerating apparatus, the combination of a chamber to be cooled, a water line provided with coils in heat exchanging relation with said chamber, a pressure-controlled pump for supplying water to said line, a relatively large storage tank supplied with water passing through said coils, and a smaller auxiliary storage tank between the coils and the large storage tank, a check valve in the water line between the two storage tanks, and means for bleeding water to relieve the pressure into the auxiliary tank at stated periods to cause the pump to supply a new charge of cold water to the coils at stated periods.

In testimony whereof I affix my signature.

LLOYD G. COPEMAN.